(12) United States Patent
Levin et al.

(10) Patent No.: US 10,686,853 B2
(45) Date of Patent: *Jun. 16, 2020

(54) CONCURRENT SERVING OF A MEDIA STREAM

(71) Applicant: Microsoft Technology Licensing, LLC, Redmond, WA (US)

(72) Inventors: Danny Levin, Tel Aviv (IL); Bradford R. Clark, Broomfield, CO (US); Amer Hassan, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/104,922

(22) Filed: Aug. 19, 2018

(65) Prior Publication Data

US 2018/0359296 A1   Dec. 13, 2018

Related U.S. Application Data

(63) Continuation of application No. 15/196,661, filed on Jun. 29, 2016, now Pat. No. 10,057,309.

(51) Int. Cl.
*H04L 1/00* (2006.01)
*H04L 29/06* (2006.01)

(52) U.S. Cl.
CPC ........ *H04L 65/4069* (2013.01); *H04L 1/0072* (2013.01); *H04L 65/4015* (2013.01); *H04L 65/4053* (2013.01); *H04L 65/602* (2013.01); *H04L 65/604* (2013.01); *H04L 65/80* (2013.01)

(58) Field of Classification Search
CPC ..................................................... H04L 1/0057
USPC ........................................ 714/776, 775, 771
See application file for complete search history.

(56) References Cited

U.S. PATENT DOCUMENTS

2015/0301912 A1\* 10/2015 Rubin .................. H04B 17/382
714/4.11
2018/0251010 A1\* 9/2018 Waseen .............. B60H 1/00857

\* cited by examiner

*Primary Examiner* — Fritz Alphonse
(74) *Attorney, Agent, or Firm* — NovoTechIP International PLLC (57) ABSTRACT

Online content is served to participant devices using two or more systems. The content served by each system is not the same. Rather, the content streams coming from each system is a partial or lower-quality version of the original high-quality version of the content stream. A single one of the partial data streams can be used by the participant device to output a lower-quality version of the original content stream to the user. Alternately, the received partial content streams can be combined to output, to the user, a high-quality version of the original content stream.

20 Claims, 6 Drawing Sheets

FIGURE 5 ical features of the
claimed subject matter, nor is it intended to be used to limit
the scope of the claimed subject matter. Furthermore, the
claimed subject matter is not limited to implementations that
solve any or all disadvantages noted in any part of this
disclosure.

BRIEF DESCRIPTION OF THE DRAWINGS

In order to describe the manner in which the above-recited
and other advantages and features can be obtained, a more
particular description is set forth and will be rendered by
reference to specific examples thereof which are illustrated
in the appended drawings. Understanding that these drawings depict only typical examples and are not therefore to be
considered to be limiting of its scope, implementations will
be described and explained with additional specificity and
detail through the use of the accompanying drawings.

DETAILED DESCRIPTION OF THE
EMBODIMENTS

Examples are discussed in detail below. While specific
implementations are discussed, it should be understood that
this is done for illustration purposes only. A person skilled
in the relevant art will recognize that other components and
configurations may be used without parting from the spirit
and scope of the subject matter of this disclosure. The
implementations may be a machine-implemented method, a
computing device, or a computer readable medium.

In an embodiment, online content is served to participant
devices using two or more data centers or servers residing
therein. The content served by each server is not the same.
Rather, the content streams coming from each server is a
partial or lower-quality version of the original high-quality
version of the content stream. A single one of the partial data
streams can be used by the participant device to output a
lower-quality version of the original content stream to the
user. In an embodiment, the received partial content streams
can be combined to output, to the user, a high-quality
version of the original content stream.

As used herein the term "real-time" is intended to broadly
refer to a condition of generally corresponding to actual
time. For example, data can be real-time if it takes about one
minute of data playback to describe an event that took about
one minute to occur. Real-time data may be, but is not
necessarily, "live" data that is generated and communicated
substantially contemporaneously with minimal delay or
such that the delay is not obtrusive with respect to a
particular application. As an example, delay of less than# CONCURRENT SERVING OF A MEDIA STREAM

CROSS REFERENCE TO RELATED APPLICATIONS

This application is a continuation of, and claims the benefit of priority to, U.S. patent application Ser. No. 15/196,661, entitled "CONCURRENT SERVING OF A MEDIA STREAM," filed on Jun. 29, 2016, and which is hereby incorporated by reference in its entirety.

BACKGROUND

Online conferencing (a.k.a., web conferencing and/or internet conferencing) systems have an array of capabilities including voice/video communications, instant messaging, data/application sharing, and white-boarding. These online collaborative service systems enable users to engage in communication sessions to exchange different types of communication media, such as voice data, video data, content sharing, and combinations thereof. Some conference systems enable users to share and collaborate in creating and modifying documents or other shared content. Online conferencing typically allows real-time point-to-point communication as well as multicast communications (i.e., from one sender to many receivers.) Some services offer data streams of voice and/or video chat to be shared, simultaneously, across geographically dispersed locations. Applications for online conferencing include meetings, training events, lectures, and presentations.

SUMMARY

Examples discussed herein relate to a system including a first server having a plurality of user devices linked to one another via the first server. The plurality of user devices share a media stream. The media stream includes at least a first partial media stream and a second partial media stream. The first partial media stream is different from the second partial media stream. The first server sends, to the plurality of user devices, the first partial media stream. The system also includes a second server having the plurality of users linked to one another via the second server. The second server sends, to the plurality of user devices, the second partial media stream.

In an example, a method of operating a system includes linking a plurality of user devices to one another via a first server. The plurality of user devices are to share a media stream. The method also includes linking the plurality of user devices to one another via a second server. The method also includes sending, from the first server and to the plurality of user devices, a first partial version of the media stream. The method also includes sending, from the second server and to the plurality of user devices, a second partial version of the media stream. The method also includes receiving, by at least a first user device of the plurality of user devices, a first portion of the first partial version and a second portion of the second partial version. The method also includes, combining, by the first user device, the first portion and the second portion to output to a user a version of the media stream.

In an example, a method of operating a user device linked to a system, includes receiving, from a first server linking a plurality of user devices to one another, a first partial version of a media stream. The method also includes receiving, from a second server, a second partial version of the media stream. The method also includes using at least one of the first partial version and the second partial version to output a version of the media stream.

This Summary is provided to introduce a selection of concepts in a simplified form that are further described below in the Detailed Description. This Summary is not intended to identify key features or essent several seconds, or less than 1.0 or 0.25 second, or another, similar time between an event and the communication of such event to another computer user may be considered live for the purposes of the present system.

In an online conference, for example, multiple participants may be sending and receiving live real-time video and audio data to one another—each is talking to one or more of the others in real-time with delay at a suitably minimal level so that "conversations" between users over the network can take place in real-time. It should therefore be appreciated that the terms, "live" or "real-time" when used in this context is not limited to zero delay, but instead that some minimal delay is allowed for which may be, for example, on the order of several seconds. The delay should not be so great as to cause difficulties in different users communicating with one another. Delays greater than about 5 seconds may be unsuitable in many applications.

Figure 1:
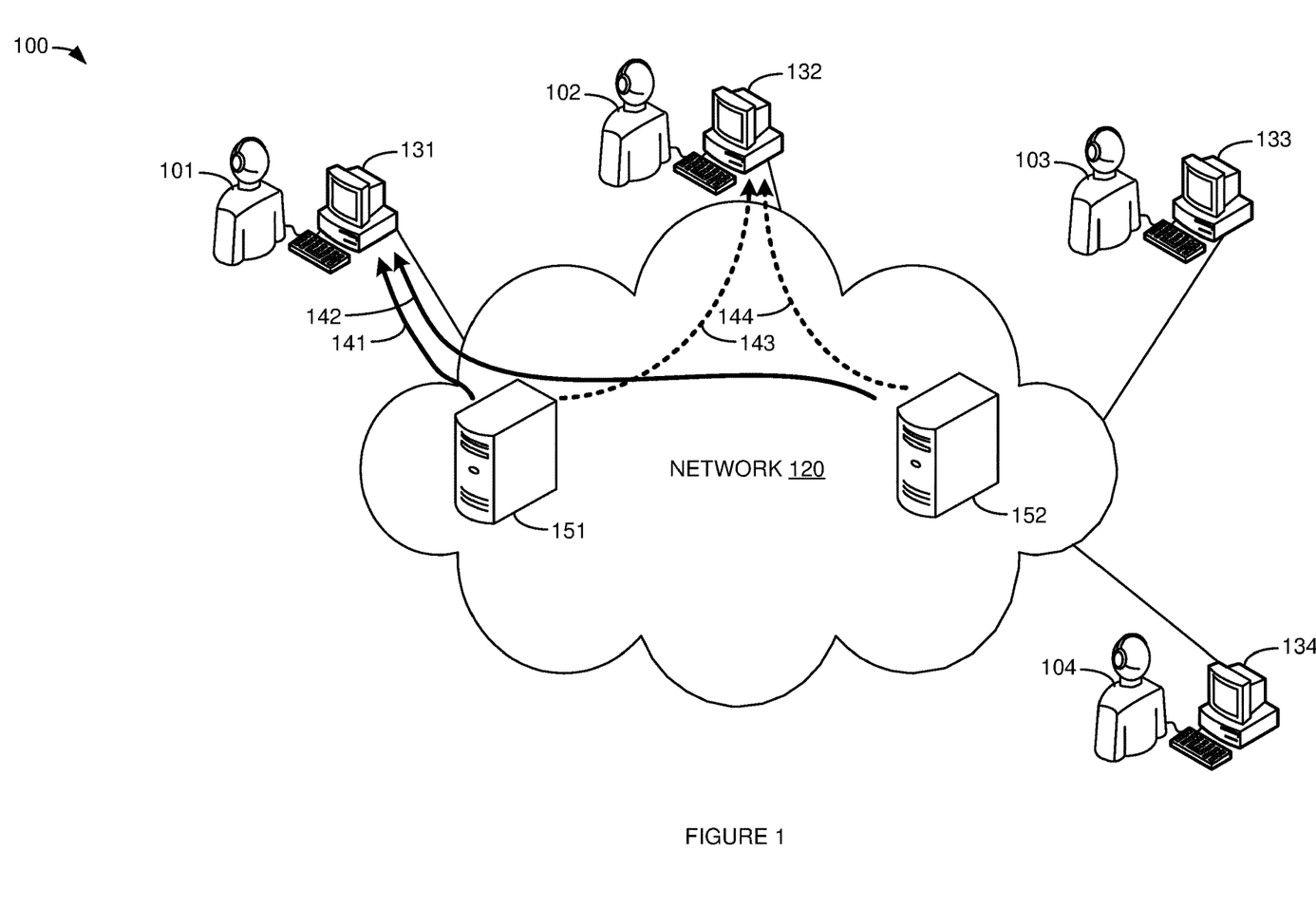
FIG. 1 is a block diagram illustrating an online communication system.

FIG. 1 is a block diagram illustrating an online communication system. In FIG. 1, system 100 comprises participants 101-104, client devices 131-134, network 120, and servers 151-152. Participants 101-104 use a software program deployed on client devices 131-134, respectively, to participate in an online communication session hosted by at least servers 151-152. Client devices 131-134 are operatively coupled to network 120. Network 120 includes, or is operatively coupled to, servers 151-152. Thus, participants 101-104, via client devices 131-134, network 120, and servers 151-152, are able to join, leave, receive, and participate in, an online communication session.

Network 120 is a wide area communication network that can provide wired and/or wireless communication with servers 151-152 by client devices 131-134. Network 120 and can comprise wired and/or wireless communication networks that include processing nodes, routers, gateways, physical and/or wireless data links for carrying data among various network elements, including combinations thereof, and can include a local area network, a wide area network, and an internetwork (including the Internet). Network 120 can also comprise wireless networks, including base station, wireless communication nodes, telephony switches, internet routers, network gateways, computer systems, communication links, or some other type of communication equipment, and combinations thereof. Wired network protocols that may be utilized by network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Links between elements of network 120, can be, for example, twisted pair cable, coaxial cable or fiber optic cable, or combinations thereof.

Other network elements may be present in network 120 to facilitate communication but are omitted for clarity, such as base stations, base station controllers, gateways, mobile switching centers, dispatch application processors, and location registers such as a home location register or visitor location register. Furthermore, other network elements may be present to facilitate communication between among elements of system 100 which are omitted for clarity, including additional computing devices, client devices, access nodes, routers, gateways, and physical and/or wireless data links for carrying data among the various network elements.

Client devices 131-134 may be, for example, a desktop computer, a tablet computer, a laptop computer, a mobile phone, a wireless phone, a personal digital assistant (PDA), a voice over internet protocol (VoIP) phone, a voice over packet (VOP) phone, or a soft phone, as well as other types of devices or systems that execute a web browser, online conferencing software, and/or online communication software (for example, the Skype™ app from Microsoft) in order to participate in a communication session hosted by servers 151-152. Other types of communication platforms are possible. An example device that may be, comprise, and/or include a client device 131-134 include, but are not limited to, example computer system 500 (described herein with reference to FIG. 5).

In an embodiment, client devices 131-134 are linked to one another via server 151. Client devices 131-134 are able to share a media stream via server 151. For example, Client devices 131-134 may be able to share a real-time media stream via server 151. Client devices 131-134 are also linked to one another via server 152.

Server 151 sends, to client devices 131-134, a first partial version of the media stream. This is illustrated in FIG. 1 by arrow 141 running from server 151 to client device 131. This is also illustrated in FIG. 1 by arrow 143 running from server 151 to client device 132. Additional arrows running from server 151 to client devices 133 and 134 could be shown in FIG. 1 to illustrate the flow of the first partial version of the content steam to client devices 133 and 134. However, these additional arrows have been omitted for the sake of brevity.

Server 152 sends, to client devices 131-134, a second partial version of the media stream. This is illustrated in FIG. 1 by arrow 142 running from server 152 to client device 131. This is also illustrated in FIG. 1 by arrow 144 running from server 152 to client device 132. Additional arrows running from server 152 to client devices 133 and 134 could be shown in FIG. 1 to illustrate the flow of the second partial version of the content steam to client devices 133 and 134. However, these additional arrows have been omitted for the sake of brevity.

In an embodiment, server 152 is designated as a redundant server to serve 151. In other words, server 152 may be configured to 'take-over' for server 151 if server 151 were to fail or otherwise be disconnected from one or more client devices 131-133 and/or network 120. Typically, server 151 and server 152 are located in geographically separate facilities. These facilities may comprise many servers. These facilities may also be referred to as data centers. An example device that may be, comprise, and/or include a server 151-152 include, but are not limited to, example computer system 500 (described herein with reference to FIG. 5).

Client device 131 receives a first portion of the first partial version of the content stream. Client device 131 receives a second portion of the second partial version of the content stream. Client device 131 may receive only a portion of the first and/or second partial version of the content stream because of dropped packets, network 120 congestion, server 151-152 congestion, server 151-152 failure, or the like.

Client device 131 combines the first portion and the second portion to output a version of the media stream to user 101. This version may be a high-quality or 'complete' version of the media stream being shared among client devices 131-134. This version may be a lower-quality or 'incomplete' version of the media stream being shared among client devices 131-134.

Likewise, client device 132 receives a third portion of the first partial version of the content stream. Client device 132 receives a fourth portion of the second partial version of the content stream. Client device 132 may receive only a portion of the first and/or second partial version of the content stream because of dropped packets, network 120 congestion, server 151-152 congestion, server 151-152 failure, or the like.

Client device 132 combines the third portion and the fourth portion to output a version of the media stream to user 101. This version may be a high-quality or 'complete' version of the media stream being shared among client devices 131-134. This version may be a lower-quality or 'incomplete' version of the media stream being shared among client devices 131-134. Because of differences in the communication path from server 151 to client device 131 (arrow 141) and client device 132 (arrow 143), the first portion of the first partial version and the third portion of the first partial version may be different. Likewise, for the same reasons, the second portion of the first second version and the fourth portion of the second partial version may be different. The first and third portions, and the second and fourth portions, may be different because the communication paths between servers 151-152 and client devices 131-132 experience different dropped packets, network 120 congestion, server 151-152 congestion, server 151-152 failure, or the like.

In an embodiment, servers 151 and 152 send partial content streams that are based on an encoded content stream having error control coding or other redundant information (e.g., repetition coding) that can be used to reconstruct the complete content stream in the presence of missing parts of the encoded content stream.

For example, a content stream to be shared may be encoded with a low-rate error control code. A content stream may be encoded with a low-rate error control code such as a Reed-Solomon encoding. The redundancy of a give Reed-Solomon encoding can be expressed as RS(N,K) where the encoding used N codewords of length N symbols each storing K symbols. In an embodiment, N>K. In another embodiment, N=2K so that at least half of all the codewords must be received by a given client device 131-134 in order to reconstruct all of the codewords sent (i.e., the 'original' content stream.) Thus, if the original content stream is split arbitrarily in half, and those halves sent by separate servers 151-152, either half of the encoded stream, if received without loss, could be used by client devices 131-134 to reconstruct a full-quality version of the content stream. Assuming there are lost packets or portions of the steams sent by servers 151-152, the remaining portions of both halves of the encoded content stream can be used to reconstruct a full-quality version of the content stream.

This low code-rate encoding can be generalized for M number of servers. In this case, an RS(M*K,K) can be used to produce M output symbols for every input symbol. The resulting encoded content stream can be split and served to client devices 131-134 by M number of servers 151-152. Other types of error control encodings may be used. For example, an appropriately selected turbo code, or the like, may be used to produce the encoded content stream that is then split for transmission from separate servers 151-152.

In another embodiment, system 100 may dynamically split the encoded data stream based on the contents of the encoded data stream. For example, system 100 may search the encoded data stream for splits that exhibit relatively large distance properties from each other. In other words, system 100 may split the encoded data stream into sequences that have large distance separations from each other and then send each of these sequences using a different server 151-152.

In an embodiment, a client device 131-134 may elect to use only one (or a subset if there are more than two servers) of the information in the content streams sent by servers 151-152. In this case, the split portions of the encoded media stream from the non-elected servers may be ignored. A client device 131-134 may elect to use a subset of the information in the content streams sent by servers 151-152 based on the quality of the content streams being received from either the servers 151-152 to be ignored, or the servers that are being used. For example, if the quality of the partial encoded content stream received from server 151 is sufficient to reproduce a full-quality version of the content steam, the partial encoded content stream from server 152 may be ignored. Conversely, for example, if the quality of the partial encoded content stream received from server 152 is so poor that it is not contributing significantly to the reproduction of a full-quality version of the content steam, the partial encoded content stream from server 152 may be ignored.

Figure 2:
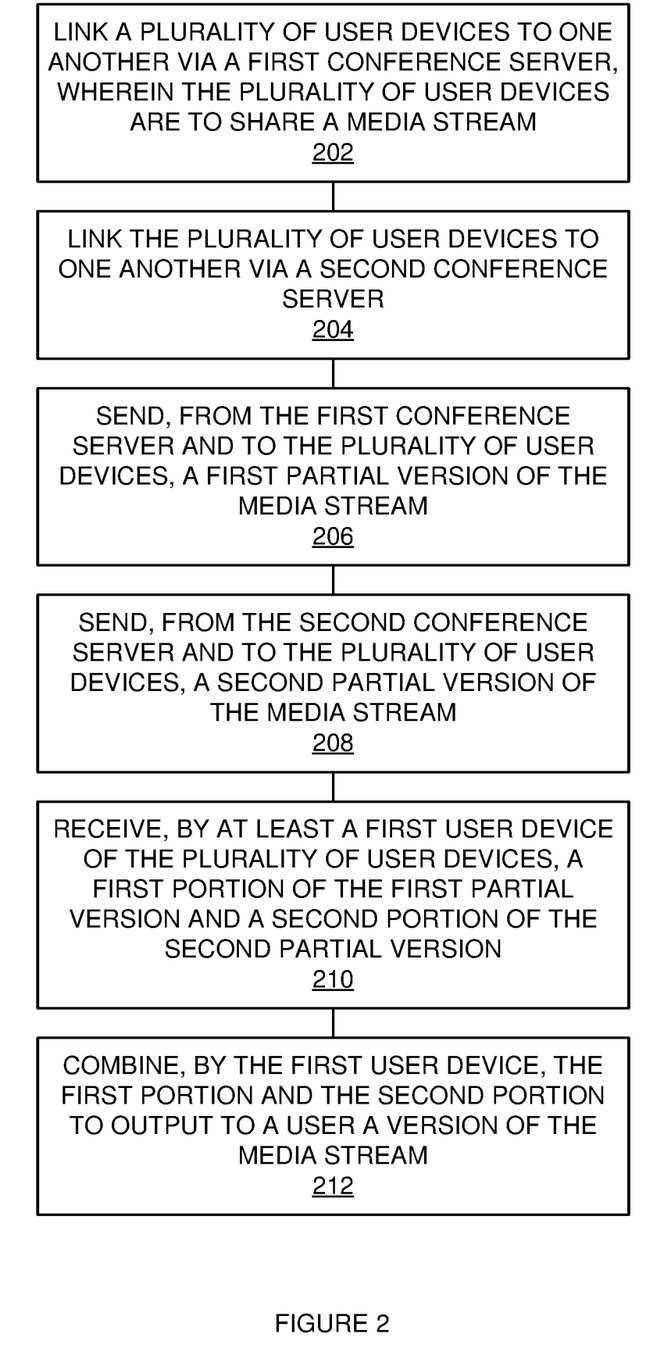
FIG. 2 is a flowchart illustrating a method of operating an
online communication system.

FIG. 2 is a flowchart illustrating a method of operating an online communication system. The steps illustrated in FIG. 2 may be performed by one or more elements of system 100. A plurality of user devices are linked to one another via a first server, wherein the plurality of user devices are to share a media stream (202). For example, client devices 131-134 may be linked to one another via server 151 for the purposes of sharing audio, video, text messages, presentations, screen-sharing, and the like. Client devices 131-134 may be linked to one another via server 151 for the purposes of sharing audio, video, text messages, presentations, screen-sharing, and the like in real-time.

The plurality of user devices are linked to one another via a second server (204). For example, client devices 131-134 may be linked to one another via server 152 for the purposes of sharing audio, video, text messages, presentations, screen-sharing, and the like. Client devices 131-134 may be linked to one another via server 152 for the purposes of sharing audio, video, text messages, presentations, screen-sharing, and the like in real-time. In another example, client devices 131-134 may be linked to one another via server 152 for the purposes of providing a redundancy in case the first server (e.g., server 151) fails.

From the first server and to the plurality of user devices, a first partial version of the media stream is sent (206). For example, server 151 may send, to client devices 131-134, a first partial version of the media stream. The partial content stream sent by server 151 may be a portion of an encoded content stream having error control coding or other redundant information (e.g., repetition coding) that can be used to reconstruct the complete content stream in the presence of missing parts of the encoded content stream.

From the second server and to the plurality of user devices, a second partial version of the media stream is sent (208). For example, server 152 may send, to client devices 131-134, a second partial version of the media stream. The partial content stream sent by server 152 may be a different portion of the encoded content stream than is being sent by server 151.

By at least a first user device of the plurality of user devices, a first portion of the first partial version and a second portion of the second partial version are received (210). For example, client device 131 may receive a first portion of the first partial version of the content stream. Client device 131 may receive a second portion of the second partial version of the content stream. Client device 131 may receive only a portion of the first and/or second partial version of the content stream because of dropped packets, network 120 congestion, server 151-152 congestion, server 151-152 failure, or the like.

By the first user device, the first portion and the second portion are combined to output to a user a version of the media stream (212). For example, client device 131 may combine the first portion and the second portion to output a version of the media stream to user 101. This version may be a high-quality or 'complete' version of the media stream being shared among client devices 131-134. This version may be a lower-quality or 'incomplete' version of the media stream being shared among client devices 131-134.

Figure 3A:
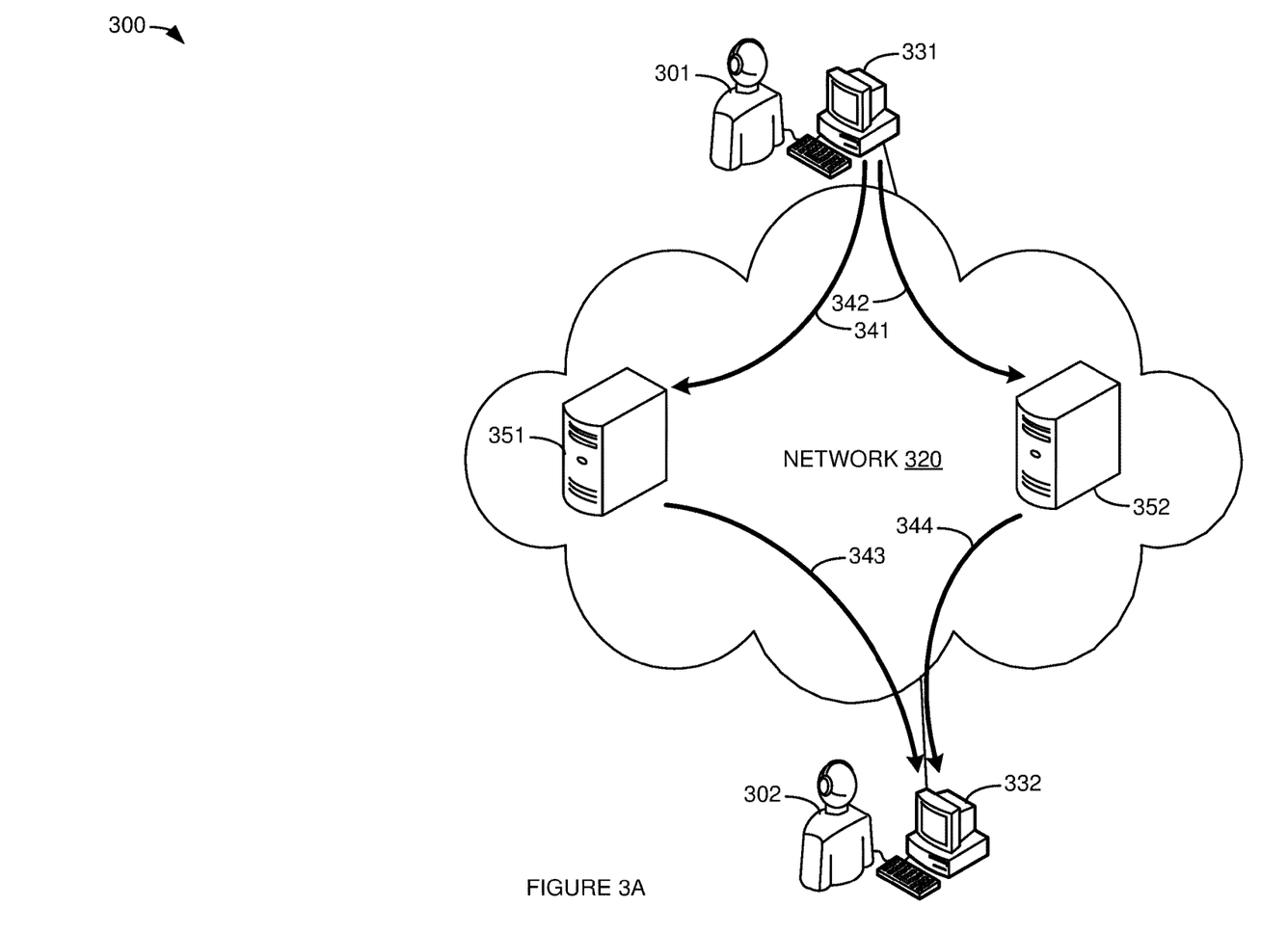
FIG. 3A is a diagram illustrating content sharing using
multiple content streams.

FIG. 3A is a diagram illustrating content sharing using multiple content streams. In FIG. 3A, system 300 comprises participants 301-302, client devices 331-332, network 320, and servers 351-352. Participants 301-302 use a software program deployed on client devices 331-332, respectively, to participate in an online communication session hosted by at least servers 351-352. Client devices 331-332 are operatively coupled to network 320. Network 320 includes, or is operatively coupled to, servers 351-352. Thus, participants 301-302, via client devices 331-332, network 320, and servers 351-352, are able to join, leave, receive, and participate in, an online communication session.

Network 120 is a wide area communication network that can provide wired and/or wireless communication with servers 351-352 by client devices 331-132. Network 320 is similar to network 120, described herein. Accordingly, further description of network 320 will be omitted here for the sake of brevity.

Client devices 331-332 may be, for example, a desktop computer, a tablet computer, a laptop computer, a mobile phone, a wireless phone, a personal digital assistant (PDA), a voice over internet protocol (VoIP) phone, a voice over packet (VOP) phone, or a soft phone, as well as other types of devices or systems that execute a web browser, online conferencing software, and/or online communication software (for example, the Skype™ app from Microsoft) in order to participate in a communication session hosted by servers 351-352. Other types of communication platforms are possible. An example device that may be, comprise, and/or include a client device 331-332 include, but are not limited to, example computer system 500 (described herein with reference to FIG. 5).

In an embodiment, client devices 331-332 are linked to one another via server 351 and server 352. Client devices 131-134 are able to share a media stream via servers 351-352.

Client device 331 sends, to server 351, a first partial version of the media stream. This is illustrated in FIG. 3A by arrow 341 running from client device 131 to server 351. Client device 331 sends, to server 352, a second partial version of the media stream. This is illustrated in FIG. 3A by arrow 342 running from client device 331 to server 351.

Server 351 sends, to client device 332, the first partial version of the media stream. This is illustrated in FIG. 3A by arrow 343 running from server 351 to client device 332. Server 352 sends, to client device 332, the second partial version of the media stream. This is illustrated in FIG. 3A by arrow 344 running from server 352 to client device 332.

In an embodiment, server 352 is designated as a redundant server to serve 351. In other words, server 352 may be configured to 'take-over' for server 351 if server 351 were to fail or otherwise be disconnected from one or more client devices 331-332 and/or network 320. Typically, server 351 and server 352 are located in geographically separate facilities. These facilities may comprise many servers. These facilities may also be referred to as data centers. An example device that may be, comprise, and/or include a server 351-352 include, but are not limited to, example computer system 500 (described herein with reference to FIG. 5).

Client device 332 receives a first portion of the first partial version of the content stream. Client device 332 receives a second portion of the second partial version of the content stream. Client device 332 may receive only a portion of the first and/or second partial version of the content stream because of dropped packets, network 320 congestion, server 351-352 congestion, server 351-352 failure, or the like.

Client device 332 combines the first portion and the second portion to output a version of the media stream to user 302. This version may be a high-quality or 'complete' version of the media stream being shared among client devices 331-332. This version may be a lower-quality or 'incomplete' version of the media stream being shared among client devices 331-332.

In an embodiment, client device 331 sends partial content streams that are based on an encoded content stream having error control coding or other redundant information (e.g., repetition coding) that can be used to reconstruct the complete content stream in the presence of missing parts of the encoded content stream. For example, a content stream to be shared by client device 331 may be encoded with a low-rate error control code and split by client device 331 as described herein.

In an embodiment, receiving client device 332 may elect to use only one (or a subset if there are more than two servers) of the information in the content streams sent by client device 331 via servers 351-352. In this case, the split portions of the encoded media stream from the non-elected servers may be ignored. Client device 302 may elect to use a subset of the information in the content streams relayed by servers 351-352 based on the quality of the content streams being received from either the servers 351-352 to be ignored, or the servers 351-352 that are being used. For example, if the quality of the partial encoded content stream received via server 351 is sufficient to reproduce a full-quality version of the content steam, the partial encoded content stream sent via server 352 may be ignored. Conversely, for example, if the quality of the partial encoded content stream received via server 352 is so poor that it is not contributing significantly to the reproduction of a full-quality version of the content steam, the partial encoded content stream sent via server 352 may be ignored.

Figure 3B:
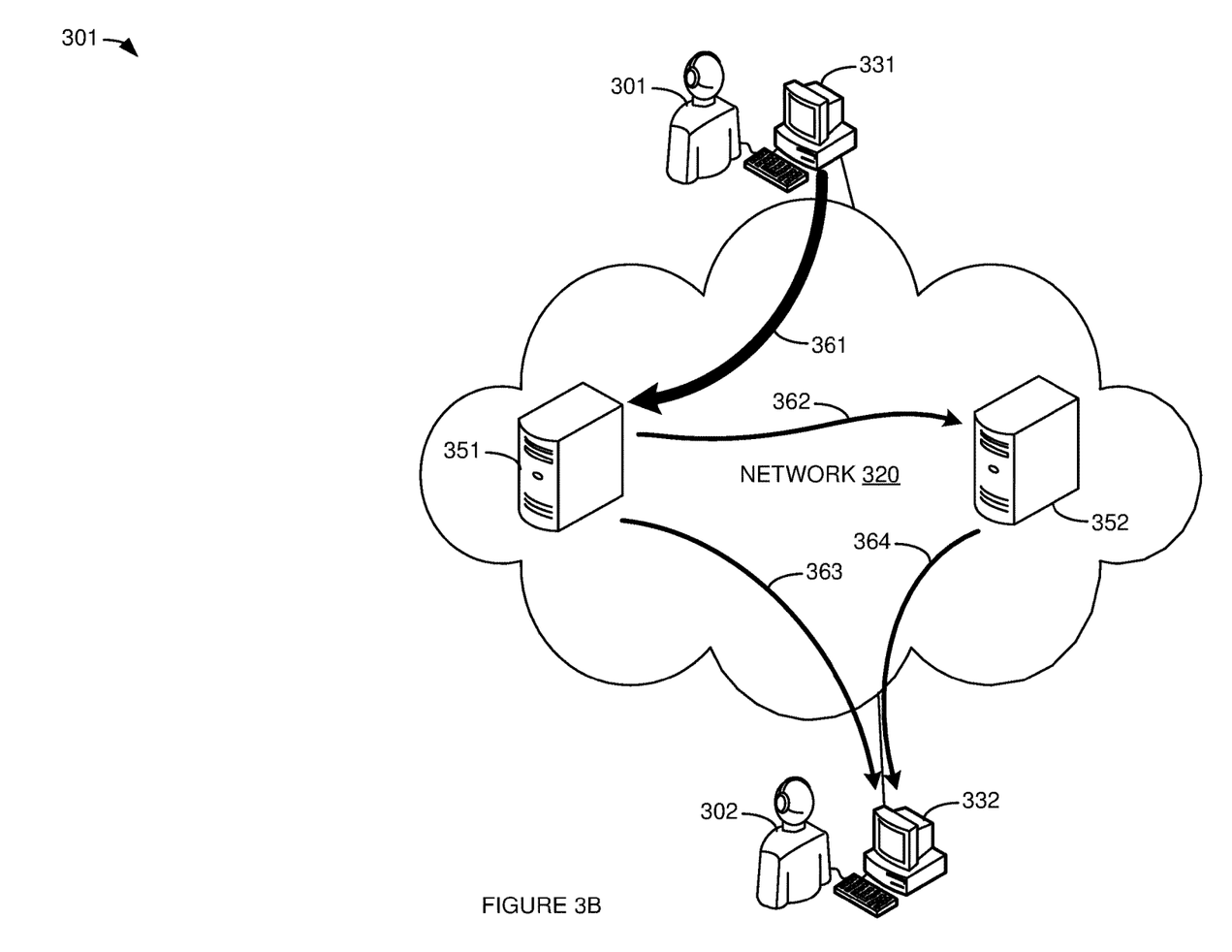
FIG. 3B is a diagram illustrating content sharing using a
single input content stream.

FIG. 3B is a diagram illustrating content sharing using a single input content stream. In FIG. 3B, system 301 comprises participants 301-302, client devices 331-332, network 320, and servers 351-352.

In an embodiment, client devices 331-332 are linked to one another via server 351 and server 352. Client devices 131-134 are able to share a media stream via servers 351-352.

Client device 331 sends, to server 351, full version of the media stream. This is illustrated in FIG. 3B by arrow 361 running from client device 131 to server 351. The full version of the media stream sent by client device 331 may be unencoded, or may be encoded as described herein. Server 351 sends, to client device 332, a first partial version of the media stream. This is illustrated in FIG. 3B by arrow 363 running from server 351 to client device 332. Server 351 sends, to server 352, a second partial version of the media stream. This is illustrated in FIG. 3B by arrow 362 running from server 351 to server 352. Server 352 sends, to client device 332, the second partial version of the media stream. This is illustrated in FIG. 3B by arrow 364 running from server 352 to client device 332. Thus, it should be understood from FIGS. 3A and 3B, that the split of the media stream being shared may be done by sending client device 331, or by a server 351. When the split is done by a single server 351, that server 351 sends the split portions to the other servers 352 that are linked to the client devices 331-332 for the purposes of the online communication session.

Figure 4:
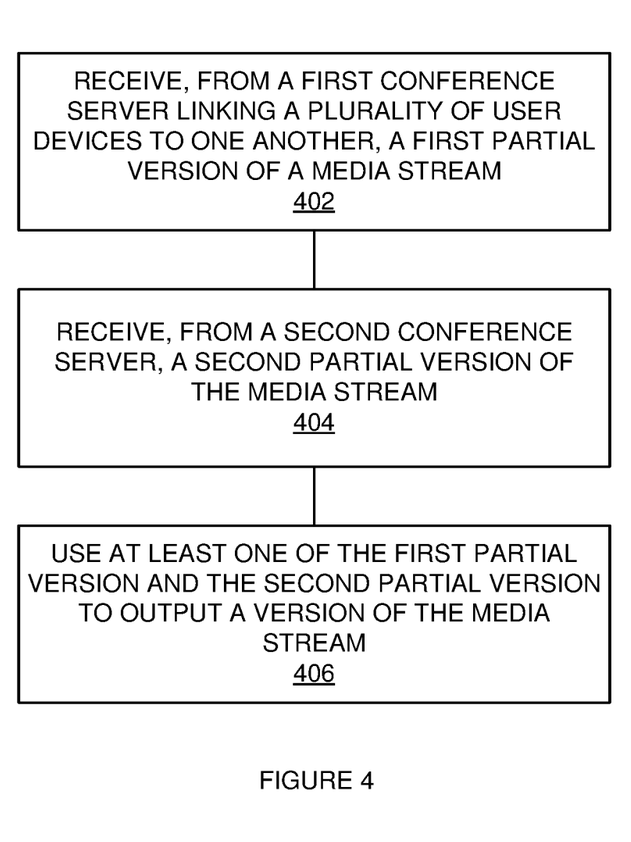
FIG. 4 is a flowchart illustrating the reception of multiple
content streams.

FIG. 4 is a flowchart illustrating the reception of multiple content streams. The steps illustrated in FIG. 4 may be performed by one or more elements of system 100, system 300, and/or system 301. From a first server linking a plurality of user devices to one another, a first partial version of a media stream is received (402). For example, client device 332 may receive, from server 351, a first partial version of a media stream. In an example, client device 332 may receive, from server 351, a partial version that was created by the sending client device 331. In another example, client device 332 may receive, from server 351, a partial version that was created by the server 351.

From a second server, a second partial version of the media stream is received (404). For example, client device 332 may receive, from server 352, a second partial version of the media stream. In an example, client device 332 may receive, from server 352, a partial version that was created by the sending client device 331. In another example, client device may receive, from server 351, a partial version that was created by the server 351 and sent to client device 332 via server 352.

At least one of the first partial version and the second partial version are used to output a version of the media stream (406). For example, the received partial versions, either alone or in combination, may be used by client device 332 to output a version of the media stream to user 302. Client device 332 may receive only a portion of the first and/or second partial version of the content stream. Client device 332 may receive only a portion of the first and/or second partial version of the content stream because of dropped packets, network 320 congestion, server 351-352 congestion, server 351-352 failure, or the like.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, system 300, and/or system 301 and their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Figure 5:
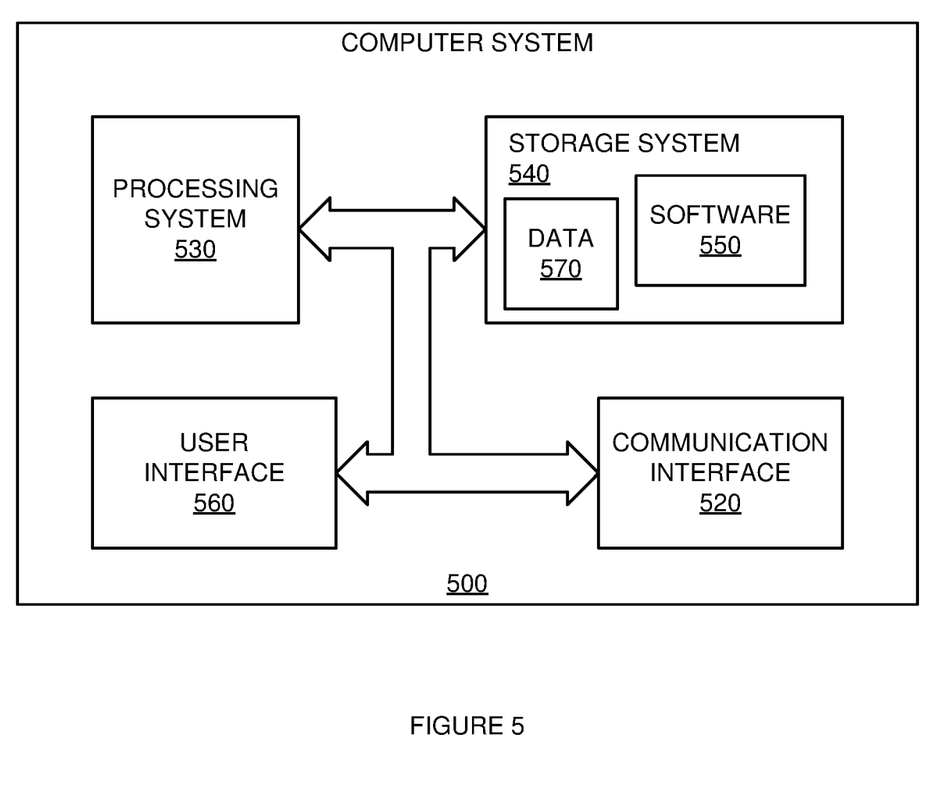
FIG. 5 is a block diagram illustrating a computer system.

FIG. 5 illustrates a block diagram of an example computer system. Computer system 500 includes communication interface 520, processing system 530, storage system 540, and user interface 560. Processing system 530 is operatively coupled to storage system 540. Storage system 540 stores software 550 and data 570. Processing system 530 is operatively coupled to communication interface 520 and user interface 560. Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-570.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, EEPROM, flash memory, network storage, server, or other memory function. Storage system 540 may include computer readable medium. Storage system 540 may be distributed among multiple memory devices.

Processing system 530 retrieves and executes software 550 from storage system 540. Processing system 530 may retrieve and store data 570. Processing system 530 may also retrieve and store data via communication interface 520. Processing system 550 may create or modify software 550 or data 570 to achieve a tangible result. Processing system may control communication interface 520 or user interface 560 to achieve a tangible result. Processing system 530 may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

Implementations discussed herein include, but are not limited to, the following examples:

Example 1

A system, comprising: a first server having a plurality of user devices linked to one another via the first server wherein the plurality of user devices share a media stream, the media stream including at least a first partial media stream and a second partial media stream, first partial media stream being different from the second partial media stream, the first server sending, to the plurality of user devices, the first partial media stream; and, a second server having the plurality of users linked to one another via the second server, the second server sending, to the plurality of user devices, the second partial media stream.

Example 2

The system of example 1, wherein at least one of the plurality of user devices combines the first partial media stream and the second partial media stream in order to output a full-quality version of the media stream.

Example 3

The system of example 1, wherein the first server and the second server are online conferencing servers.

Example 4

The system of example 1, wherein the media stream originates from a first user device of the plurality of user devices and the first server splits the media stream into the first partial media stream and the second partial media stream.

Example 5

The system of example 1, wherein the media stream originates from a first user device of the plurality of user devices and the first user device splits the media stream into the first partial media stream and the second partial media stream.

Example 6

The system of example 1, wherein the media stream includes error control coding.

Example 7

The system of example 6, wherein at least one of the plurality of user devices uses error control coding in the first partial media stream to output a full-quality version of the media stream.

Example 8

A method of operating a system, comprising: linking a plurality of user devices to one another via a first server, wherein the plurality of user devices are to share a media stream; linking the plurality of user devices to one another via a second server; sending, from the first server and to the plurality of user devices, a first partial version of the media stream; sending, from the second server and to the plurality of user devices, a second partial version of the media stream; receiving, by at least a first user device of the plurality of user devices, a first portion of the first partial version and a second portion of the second partial version; and, combining, by the first user device, the first portion and the second portion to output to a user a version of the media stream.

Example 9

The method of example 8, wherein the first portion and the second portion are used by the first user device to output a full-quality version of the media stream.

Example 10

The method of example 8, wherein the first partial version and the second partial version include error control information.

Example 11

The method of example 8, further comprising: receiving, by the first server and from a second user device of the plurality of user devices, the media stream.

Example 12

The method of example 8, further comprising: receiving, by the first server and from a second user device of the plurality of user devices, the first partial version of the media stream; and, receiving, by the second server and from the second user device of the plurality of user devices, the second partial version of the media stream.

Example 13

The method of example 8, wherein the first partial version of the media stream and the second partial version of the media stream include error control information calculated from the media stream.

Example 14

The method of example 8, further comprising: receiving, by the first server and from a second user device of the plurality of user devices, the media stream; and, receiving, by the second server and from the first server, the second partial version of the media stream.

Example 15

A method of operating a user device linked to a system, comprising: receiving, from a first server linking a plurality of user devices to one another, a first partial version of a media stream; receiving, from a second server, a second partial version of the media stream; and, using at least one of the first partial version and the second partial version to output a version of the media stream.

Example 16

The method of example 15, further comprising: decoding error control information provided by at least one of the first partial version and the second partial version to output the version of the media stream.

Example 17

The method of example 16, wherein decoding the error control information provided by at least one of the first partial version and the second partial version produces a full-quality version of the media stream.

Example 18

The method of example 15, wherein the media stream includes error control information that was determined by a second user device of the plurality of user devices.

Example 19

The method of example 15, wherein the media stream includes error control information that was determined by at least one of the first server and the second server.

Example 20

The method of example 19, wherein the second partial version is provided to the second server by the first server.

The foregoing descriptions of the disclosed embodiments have been presented for purposes of illustration and description. They are not intended to be exhaustive or to limit the scope of the claimed subject matter to the precise form(s) disclosed, and other modifications and variations may be possible in light of the above teachings. The embodiments were chosen and described in order to best explain the principles of the disclosed embodiments and their practical application to thereby enable others skilled in the art to best utilize the various embodiments and various modifications as are suited to the particular use contemplated. It is intended that the appended claims be construed to include other alternative embodiments except insofar as limited by the prior art.

What is claimed is:

1. A communication system, comprising:
   a first server in communication with a plurality of user devices, wherein the plurality of user devices share a media stream including at least a first partial media stream and a second partial media stream that is different from the first partial media stream, the first server sending, to the plurality of user devices, the first partial media stream; and
   a second server in communication with the plurality of user devices, the second server sending, to the plurality of user devices, the second partial media stream.

2. The system of claim 1, wherein at least one of the plurality of user devices combines the first and second partial media streams in order to output a full-quality version of the media stream.

3. The system of claim 1, wherein the first server and the second server include an online conferencing server.

4. The system of claim 1, wherein:
   the media stream originates from a first user device of the plurality of user devices, and
   the first server is configured to split the media stream into the first and second partial media streams.

5. The system of claim 1, wherein:
   the media stream originates from a first user device of the plurality of user devices, and
   the first user device is configured to split the media stream into the first partial media stream and the second partial media stream.

6. The system of claim 1, wherein:
   the media stream includes error control coding, and
   the first partial media steam includes error control coding.

7. The system of claim 6, wherein at least one of the plurality of user devices is configured to use error control coding in the first partial media stream to output a version of the media stream.

8. A method of operating a communication system including (i) a plurality of user devices sharing a media stream comprising first and second partial media streams and (ii) first and second servers in communication with the plurality of user devices, the method comprising:
   sending, from the first server and to the plurality of user devices, the first partial media stream;
   sending, from the second server and to the plurality of user devices, the second partial the media stream;
   receiving, by at least a first user device of the plurality of user devices, the first and second partial media streams; and
   combining, by the first user device, the first and second partial media streams to output the media stream.

9. The method of claim 8, wherein the first and second partial media streams are used by the first user device to output a full-quality version of the media stream.

10. The method of claim 8, wherein the first and second partial media streams include error control information.

11. The method of claim 8, further comprising receiving, by the first server and from a second user device of the plurality of user devices, the media stream.

12. The method of claim 8, further comprising:
    receiving, by the first server and from a second user device of the plurality of user devices, the first partial media stream, and
    receiving, by the second server and from the second user device of the plurality of user devices, the second partial media stream.

13. The method of claim 8, wherein the first and second partial media streams include error control information calculated from the media stream.

14. The method of claim 8, further comprising:
    receiving, by the first server and from a second user device of the plurality of user devices, the media stream; and
    receiving, by the second server and from the first server, the second partial media stream.

15. A method of operating a first user device of a plurality of user devices in communication with first and second servers, the plurality or user devices sharing a media stream comprising first and second partial media streams, the method comprising:
    receiving, from the first server, the first partial media stream;
    receiving, from the second server, the second partial media stream; and
    using at least one of the first and second partial media streams to output a version of the media stream.

16. The method of claim 15, further comprising decoding error control information provided by at least one of the first and second partial media streams to output the version of the media stream.

17. The method of claim 16, wherein decoding the error control information produces a full-quality version of the media stream.

18. The method of claim 15, wherein the media stream includes error control information determined by a second user device of the plurality of user devices.

19. The method of claim 15, wherein the media stream includes error control information determined by at least one of the first and second servers.

20. The method of claim 19, wherein the second partial media stream is provided to the second server by the first server.

* * * * *